April 12, 1927.
O. D. HAPGOOD
LEVEL
Filed Feb. 19, 1926
1,624,339
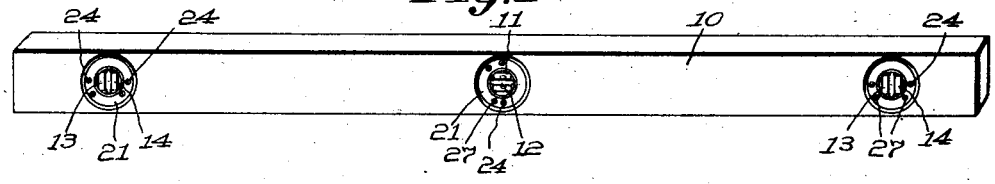
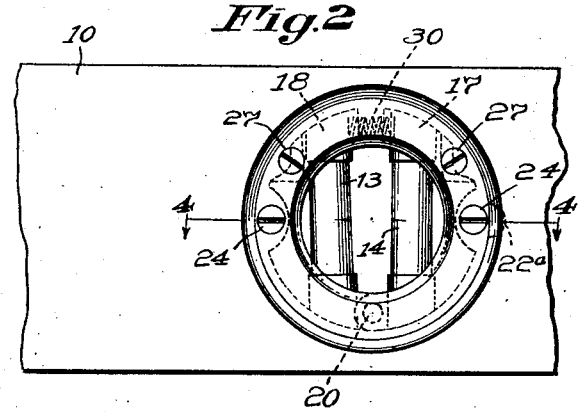
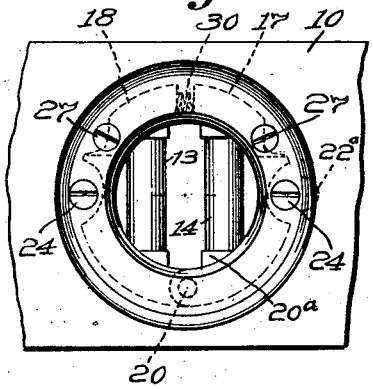
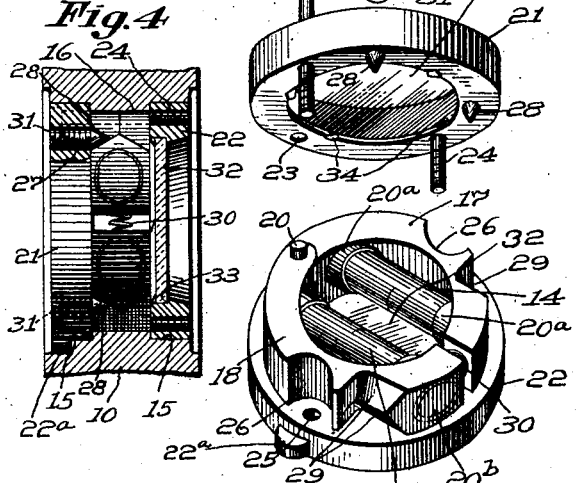
INVENTOR
Oscar D. Hapgood
BY Robt. P. Hains
ATTORNEY Patented Apr. 12, 1927.

1,624,339

UNITED STATES PATENT OFFICE

OSCAR D. HAPGOOD, OF MONTAGUE, MASSACHUSETTS, ASSIGNOR TO GOODELL-PRATT COMPANY, OF GREENFIELD, MASSACHUSETTS, A CORPORATION OF MASSACHUSETTS.

LEVEL.

Application filed February 19, 1926. Serial No. 89,331.

This invention relates to levels and more particularly to means for mounting spirit levels upon a level stock so that they may be readily adjusted to correct their reading.

It is usually desirable to mount a pair of spirit levels in each of the level receiving openings of a level stock to facilitate reading of the level when either straight edge is placed against the work, and it is important that each spirit level be accurately adjusted with respect to the straight edges of the level so that they will read correctly.

The present invention therefore relates to simple means for mounting a pair of spirit levels within the bore of a level stock so that each spirit level may be easily and accurately adjusted independently of the other.

One important feature of the present invention resides in a pair of level carriers which are pivotally connected for independent adjustment about their pivot point, and in means for retaining each carrier in the desired position of adjustment.

Another feature of the invention resides in means that may be readily adjusted to gradually swing a carrier about its pivot point to the desired position of adjustment.

Still another feature of the invention resides in the construction whereby the spirit levels may be readily adjusted without removing or disassembling parts of the supporting casing.

The various features of the invention and novel combination of parts will be best understood from the following description and accompanying drawings of one good practical form of the invention.

In the drawings:—

Fig. 1 is a perspective view of a level provided with means constructed in accordance with the present invention for supporting and adjusting the spirit levels;

Fig. 2 on an enlarged scale is a face view of a portion of Fig. 1, showing a pair of spirit levels disposed at a slight angle to each other;

Fig. 3 is a view similar to Fig. 2, but shows the spirit levels adjusted toward each other into parallel relation;

Fig. 4 is a sectional view taken on the line 4—4 of Fig. 2;

Fig. 5 is a perspective view of the inner face of a supporting ring or side plate;

Fig. 6 is a perspective view of the tube carriers mounted upon the other supporting ring or side plate; and Fig. 7 is an edge view of the parts of Figs. 5 and 6 assembled and looking toward the pivotal connection for the tube carriers.

The level stock shown in the drawings and designated by 10 may be formed of wood, metal or other suitable material, and as shown is provided with a central bore in which a pair of horizontally extending spirit levels 11 and 12 are mounted, and the level stock is provided with additional bores adjacent its opposite ends in which the vertically disposed spirit levels 13 and 14 are mounted.

The bore or opening in which the spirit levels are mounted may be variously formed, and as shown is counterbored at each side of the stock 10 as at 15 to thereby form the central web portion 16 having a somewhat smaller diameter than the counterbored portions 15. This construction however is not an essential feature of the present invention since the bore for the spirit levels may be given various constructions.

In each of the bores of the level stock 10 are preferably mounted a pair of level carriers 17 and 18, each of which is preferably formed in the shape of an arc or semi-circle as shown, and these carriers are preferably pivotally connected to each other at one end, as will be apparent from the drawings, wherein each of the carriers is shown as provided with a lug portion 19 that extends into overlapping relating with a similar lug portion of the other carrier, and these two lug portions are provided with aligned drill holes adapted to receive a pivot pin 20. As a result of this construction the carriers 17 and 18 are adapted to be moved about their pivot pin 20 towards and from each other to different positions of adjustment, as will be apparent upon comparing Figs. 2 and 3. Each of the carriers 17 and 18 is provided with a spirit level such as designated by 11 to 14 inclusive in Fig. 1. These spirit levels are mounted in sleeves 20ª that extend inwardly from the inner curved face of the carriers near their opposite ends, as will be apparent from Fig. 6, and the opposite ends of the spirit levels may be protected by suitable plastic material 20$^b$, as is usual.

The size and shape of the connected carriers 17 and 18 is preferably such that they will lie within the bore of the central web portion 16 of the stock 10, as best shown in Fig. 4, and the width or thickness of the carriers 17 and 18 is preferably slightly less than the width of the flange portion 16 so that when the rings or side plates 21 and 22 are mounted in the counterbored portions 15 of the stock, these rings will retain the carriers 17 and 18 in place without exerting a clamping pressure upon the opposite faces of the carriers.

In the construction shown both of the rings or side plates 21 and 22 are illustrated as removably mounted in the bore of the stock, and this is desirable when the stock 10 is formed of wood, but if the stock is made of metal this is not essential, since, if desired, one of the rings or side plates 21 may constitute an integral portion of the stock. When the ring 22 is not formed integral with the stock 10 it is desirable to provide the same with a locating lug 22$^a$ adapted to enter a correspondingly shaped notch formed in the stock 10 to aid in properly positioning the carriers within the stock and also to prevent the ring 22 from turning in the stock after the parts have been assembled.

The pivot pin 20 is preferably rigidly secured to one of the rings or side plates to thereby prevent the carriers 17 and 18 from rotating or moving bodily within the bore of the stock 10, and to this end, in the construction shown, the pin 20 is fitted snugly in a drill hole formed in the ring 22 and projects from the inner face of this ring. The opposite end of the pin 20 may enter a socket or drill hole 23 formed in the inner face of the ring or side plate 21.

The means shown for securing the opposite rings or side plates within the bore of the stock 10 consists of through bolts 24 each of which has an enlarged head that fits within a countersunk hole in the outer face of the ring 21, and the opposite end of each bolt 24 is screwed into the threaded hole 25 of the ring 22. Each of the carriers 17 and 18 preferably has a portion 26 thereof cut away to clear these securing bolts, and, as above stated, the width of the web 16 is preferably such that the rings 21 and 22 may be held in tight clamping engagement with the opposite faces of the web 16 without exerting a clamping pressure upon the adjustable carriers 17 and 18.

The means for moving the level carriers towards and from each other for independent adjustment may be variously constructed, and the means shown to this end consists of the adjusting screws 27 having threaded engagement with drill holes formed in the ring 21, and each of these screws has a tapered or pointed end 28 adapted to engage a face of one of the carriers to force the same inwardly towards the other carrier with a wedging action. To facilitate the adjustment of the carriers 17 and 18 by the screws 27, each of the carriers is provided with a cut away portion 29, and, as will be apparent from Fig. 6, the opposite faces of the carriers 17, 18 are similarly cut away so that the adjusting screws 27 may act upon either side portion of a carrier.

In the construction shown, the free ends of the carriers 17 and 18 are urged away from each other by a compressed spring 30 the opposite ends of which are received in sockets formed in the ends of the carriers 17 and 18; the arrangement is such that when the parts are assembled the spring 30 will exert a continuous spreading action upon the carriers to hold them against the adjusting screws 27, and each carrier may be adjusted independently of the other carrier by simply rotating its adjusting screws 27. It should be noted that since the adjusting screws 27 are mounted within threaded holes within the ring 21 so that the outer ends of these screws are accessible from the exterior of the level casing, they may be readily adjusted after the parts of the level have been assembled by merely engaging the point of a screwdriver with the screw 27 that is to be rotated. After the screws 27 have been once adjusted to cause the spirit levels to read properly, they should not be disturbed until further adjustment is necessary, and in order to prevent these screws from being accidentally rotated, it may be desirable to construct the same as best shown in Fig. 4, wherein it will be seen that the outer ends of the screws 27 are spaced inwardly from the outer face of the ring 21 to permit a short cover screw 31 to be mounted in the threaded holes for the screws 27 to thereby protect and cover the outer ends of these screws. It is desirable to provide each side of the level supporting casing with protecting cover plates 32 formed of glass or other transparent material, and in the construction shown these cover plates 32 are secured in place by providing each of the rings 21 and 22 with a countersunk portion 33 adjacent its inner face to receive a glass plate 32, and these plates may be retained in place by bending edge portions of the rings 21 and 22 inwardly to form lips 34 extending over the edges of the glass plates to hold them in place, as best shown in Fig. 5.

From the foregoing description, when read in connection with the drawings, it will be seen that each of the carriers 17 and 18 may be adjusted about the pivot pin 20 independently of the other carrier by merely rotating the proper adjusting screw 27 to swing the carrier inwardly or outwardly to the desired position of adjustment, and that since the spring 30 exerts a substantial spreading pressure upon the adjacent ends of the carriers 17 and 18, the carriers will be at all times held in firm engagement with the inner tapered ends 28 of the adjusting screws. The level supporting means shown and described may be mounted either in the central bore of the stock 10, or in the bore adjacent either end thereof, the only difference being that when the level supporting means is mounted in the central bore, the outer rings or side plates 21, 22 should be rotated to a position in which the levels 11 and 12 lie substantially parallel with the straight edges of the stock 10 before the clamping screws 24 are tightened, whereas if the level supporting means are mounted in the bore adjacent either end of this stock the rings 21, 22 should be rotated to a position in which the levels extend transversely of the stock before the clamping screws 24 are tightened. The rotation of the ring 22 to the proper position before the parts are assembled may be insured by forming the notch that receives the lug 22ª at a predetermined point.

It should be noted that by mounting the pivoted carriers within the bore 16 of the stock between the side plates 21 and 22, and by positioning the level adjusting screws 27 in a side plate as shown, the entire level mechanism may be mounted within an annular bore formed in the stock 10 and as a result it is unnecessary to form additional drill holes or recesses in the stock to receive the level adjusting screws. In this manner the cost of constructing the complete level is materially reduced.

What is claimed is:—

1. A spirit level, comprising in combination, a level stock having an annular bore, a ring mounted in the bore at one side of the stock and provided with a lug that engages a portion of the stock to prevent the ring from rotating in said bore, a level carrier pivotally mounted upon said ring for swinging adjustment within the bore, a level tube mounted upon the carrier, a second ring mounted in the bore at the opposite side of the level, and adjusting means for rocking the level carrier about its pivotal mounting and for retaining the same in the desired position of adjustment.

2. A spirit level, comprising in combination, a level stock having an annular bore formed transversely through the stock and having its ends counterbored to form seats for the side rings, a side ring mounted in each seat, a pair of curved level carriers mounted in said bore and pivotally connected for swinging adjustment relatively to each other, a level tube mounted upon each carrier, a fixed pivot pin secured to one of said rings and projecting into said bore to form a bearing pin to which the carriers are pivotally secured, adjusting means mounted upon one of said rings for holding the carriers in different positions of adjustment, and through bolts extending through said bore from one ring to the other for securing the rings in place.

3. As an article of manufacture, a spirit level mounting adapted to be secured in the bore of a level stock and comprising in combination, a pair of carrier supporting rings one of which is provided with a laterally extending pivot pin, a pair of curved level carriers adapted to be mounted between said rings and each having an end that is pivotally secured to said pin, through bolts extending from one ring into engagement with the other to connect the rings, and adjusting means extending from the inner face of a ring into engagement with a carrier to adjust the latter relatively to the ring.

4. A spirit level, comprising in combination, a level stock having a bore formed transversely through the stock, a curved level carrier mounted in said bore for adjustment therein, a pair of rings mounted in the bore at the opposite sides of the carrier to hold the carrier between them, means for pivotally connecting the carrier to one of said rings, and an adjusting screw mounted in one of the rings to extend longitudinally of the bore and having a pointed inner end for exerting a wedging action on the carrier in a direction at right angles to the axis of the screw to swing the carrier about its pivot point.

5. A spirit level, comprising in combination, a level stock having a bore formed transversely through the stock, a pair of carrier supporting rings adapted to be mounted in said bore, means for fastening the rings therein, a pair of curved level carriers mounted between said rings and pivotally connected to one of the rings for rocking movement, a level tube mounted upon each carrier, and adjusting means extending from the inner face of a ring into engagement with a carrier to adjust the latter about its pivot point.

6. A spirit level, comprising in combination, a level stock having a bore formed transversely through the stock, a spirit level mounting adapted to lie in its entirety within said bore so that the opposite faces of the stock adjacent the bore will be free from projecting parts and including, a pair of curved level carriers mounted within said bore and having their ends connected for rocking movement relatively to each other, a level tube mounted upon each carrier, a ring mounted within said bore to retain the carriers in place therein, and a pair of screws one for each carrier mounted within said bore to adjust the carriers about their pivot point and the screws being arranged so that they extend transversely of the level stock lengthwise of said bore to be operated from a side face of the stock.

7. A spirit level, comprising in combination, a level stock having a bore formed transversely through the stock, a pair of curved level carriers mounted in said bore, side plates within the bore at opposite sides of the carriers for holding the carriers within the bore, means for pivotally connecting the carriers to a side plate for rocking movement, a spring for urging the carriers apart, a level tube mounted upon each carrier, and a pair of screws one for each carrier extending through a side plate transversely of the stock and having an inner end that engages a carrier to shift it.

8. A spirit level, comprising in combination, a level stock having a bore formed transversely through the stock, a pair of curved level carriers mounted in said bore, a level tube mounted upon each carrier, side plates within said bore for holding the carriers therein, means for pivotally connecting the carriers to a side plate for rocking movement, and an adjusting screw for each carrier mounted in a side plate within said bore in spaced relation to the surrounding wall of the stock and having an inner end that engages the carrier to shift it.

9. A spirit level comprising in combination, a level stock having a bore formed transversely through the stock, a pair of curved level carriers mounted in said bore and each having a hinge lug constructed to lie in overlapping relation to the hinge lug of the other carrier, a level tube mounted upon each carrier, side plates for retaining the carriers within said bore, a pivot pin secured to one of the side plates and extending through said lugs to pivotally secure the carriers to the side plate, and adjusting means extending from the inner face of a side plate into engagement with the carriers to adjust the carriers about the pivot pin.

In testimony whereof, I have signed my name to this specification.

OSCAR D. HAPGOOD.